United States Patent
Kondo

(10) Patent No.: US 6,918,639 B2
(45) Date of Patent: Jul. 19, 2005

(54) ELASTIC CRAWLER

(75) Inventor: Satoru Kondo, Izumi-Ohtsu (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 38 days.

(21) Appl. No.: 10/608,610

(22) Filed: Jun. 30, 2003

(65) Prior Publication Data

US 2004/0026217 A1 Feb. 12, 2004

(30) Foreign Application Priority Data

Aug. 12, 2002 (JP) .................................... 2002-235154

(51) Int. Cl.⁷ .............................................. B62D 55/24
(52) U.S. Cl. ...................................... 305/167; 305/170
(58) Field of Search ............................... 305/165, 166, 305/167, 170, 182, 183

(56) References Cited

U.S. PATENT DOCUMENTS 6,523,915 B1 * 2/2003 Matsuo ....................... 305/167

FOREIGN PATENT DOCUMENTS

| DE | 43 40 159 A1 | | 6/1995 |
|---|---|---|---|
| EP | 0 251 255 A2 | | 1/1988 |
| JP | 3-262787 | * | 11/1991 |
| JP | 3-295776 | * | 12/1991 |
| JP | 5-97073 | * | 4/1993 |
| JP | 6-144310 | * | 5/1994 |
| JP | 2000-103374 A | | 4/2000 |
| SU | 903241 | * | 2/1982 |
| WO | 01/14202 A1 | | 3/2001 |

* cited by examiner

Primary Examiner—Russell D. Stormer
(74) Attorney, Agent, or Firm—Birch, Stewart, Kolasch & Birch, LLP

(57) ABSTRACT

An elastic crawler includes a crawler body formed of an elastic material into an endless belt shape; and a tension member including a plurality of tension cords having opposite ends which are embedded in the crawler body so as to extend along a circumferential direction of the crawler and to be arranged in parallel to each other in a widthwise direction of the crawler. The tension member is formed into a loop by overlapping opposite end portions of each tension cord, extremities of the opposite ends of each tension cord of the tension member are aligned diagonally with respect to the widthwise direction of the crawler, and the overlapping width of the overlapped portion of the tension member in the widthwise direction of the crawler is smaller than an entire width of the tension member in the widthwise direction of the crawler at any position in the circumferential direction of the crawler.

6 Claims, 6 Drawing Sheets

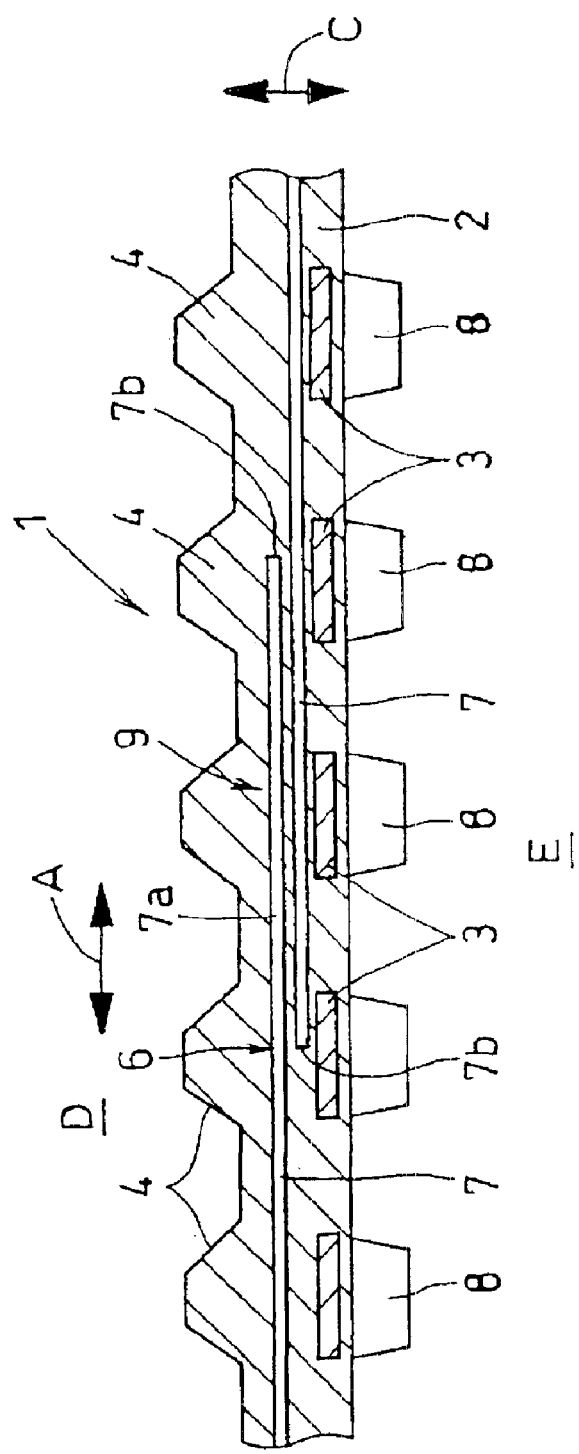

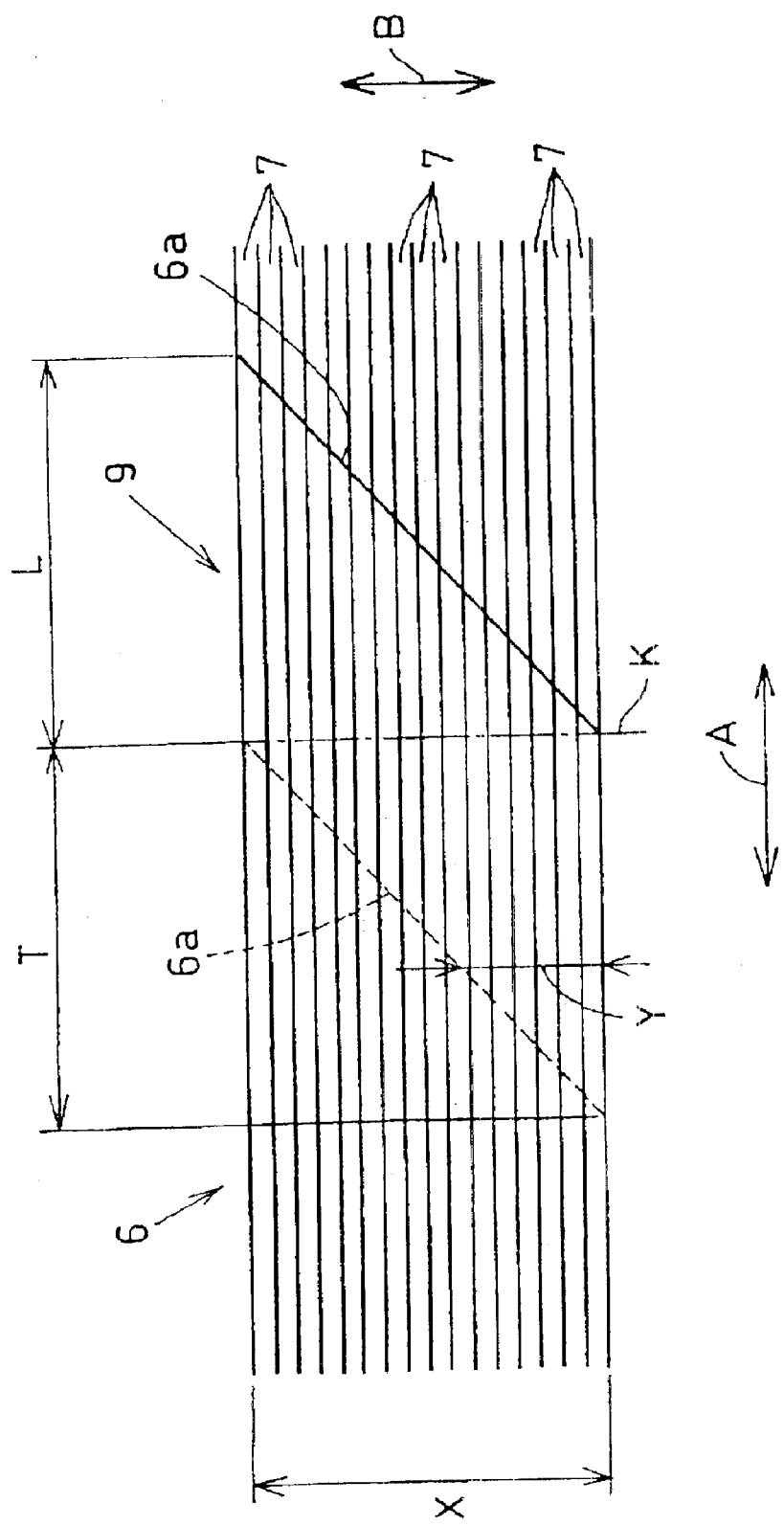

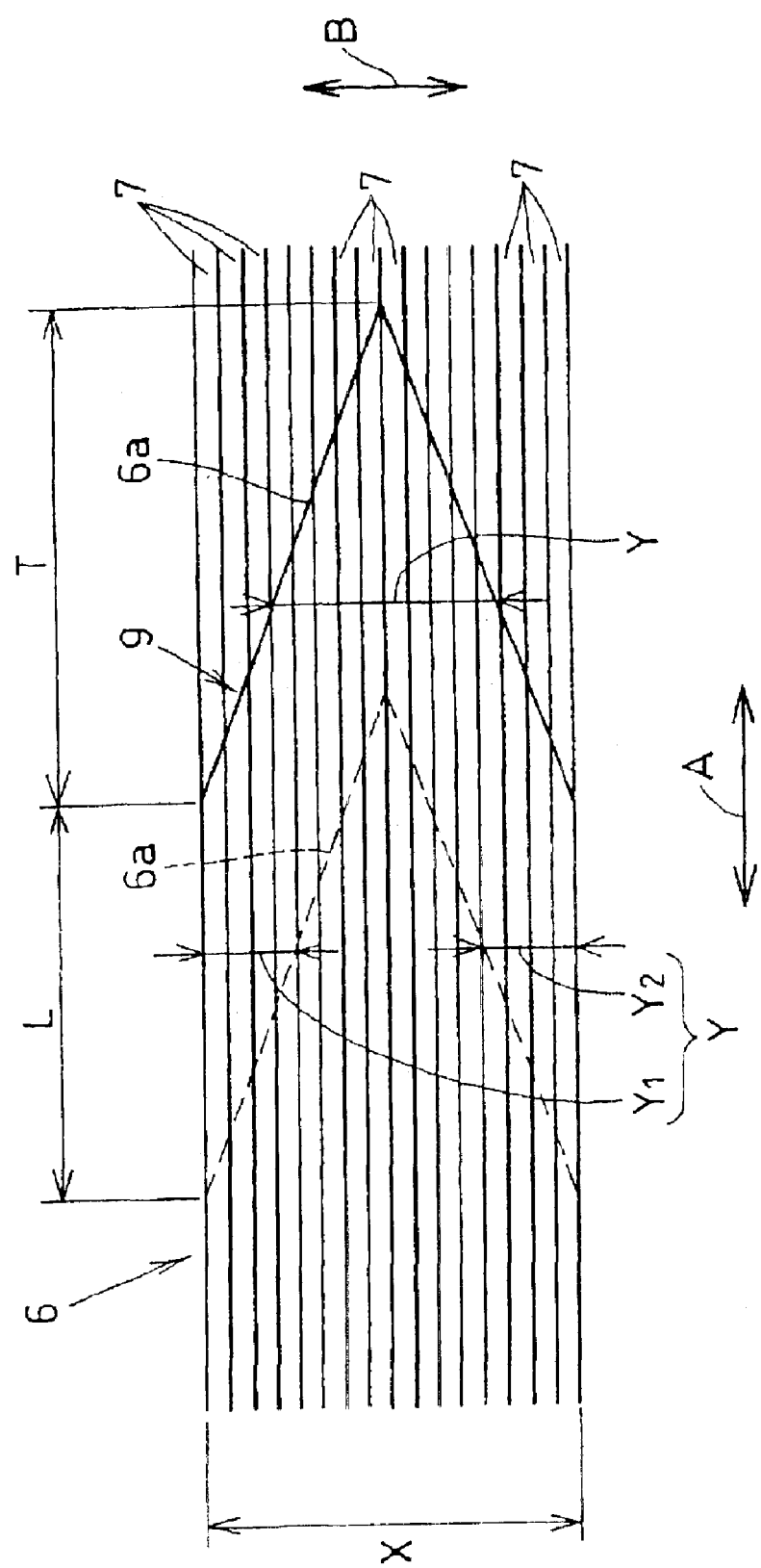

ELASTIC CRAWLER

BACKGROUND OF THE INVENTION

1. Field of the Invention

The present invention relates to an elastic crawler employed in a crawler-mounted traveling device used as a traveling unit for construction and engineering equipment or agricultural equipment.

2. Description of the Related Art

A conventional crawler-mounted traveling device includes a driving sprocket disposed either on front or rear side in the direction of travel, an idler disposed on the other side, a plurality of rollers disposed between the driving sprocket and the idler, and an endless belt-shaped rubber crawler (crawler belt) wound around the driving sprocket, the idler, and the tracker rollers, wherein the rubber crawler is circulated in a circumferential direction thereof by rotating the driving sprocket.

An endless crawler body of the rubber crawler is formed of rubber, and the crawler is provided with a tension member embedded circumferentially of the crawler because a significantly large force (tension) is exerted on the rubber crawler in the circumferential direction thereof.

A conventional tension member is constructed by disposing a multiplicity of tension cords having opposite ends in parallel to each other in a widthwise direction of the crawler body, and winding around the crawler body one full circle in the circumferential direction of the crawler (See JP-A-2000-103374).

In this tension member, each tension cord is formed into a loop by overlapping and joining its opposite ends in a thicknesswise direction of the crawler in the crawler body (lap joint).

As shown in FIG. 6A, which corresponds to JP-A-2000-103374, in a tension member 16 in which longitudinally (the circumferential direction A of the crawler, and referred simply as the "circumferential direction A", hereinafter) opposite edges 16a are cut along the direction orthogonal to the circumferential direction A and overlapped, longitudinal ends of tension cords 17 are linearly aligned in a widthwise direction B of the crawler (hereinafter, referred simply as the "widthwise direction B") Therefore, it is obvious that bending rigidity of the tension member around the boundaries is significantly different between a single-ply portion (a portion of the tension member which is not overlapped) and a double-ply portion (a portion of the tension member which is overlapped). This results in an extreme variation in bending rigidity in the circumferential direction A, and thus improvement of the rubber crawler has been required.

In order to solve the problem of bending rigidity, the edges 16a of the tension member 16 in the circumferential direction A are cut diagonally with respect to the widthwise direction B, as shown in FIG. 6B.

In the tension member 16 shown in FIG. 6B, which corresponds to JP-A-2000-103374, since the ends of the tension cords 17 are aligned diagonally with respect to the widthwise direction B, the variation in rigidity around the boundaries between the single-ply portion and the double-ply portion in the circumferential direction A is alleviated. However, since a distance T in the circumferential direction A from one end to the other end of the longitudinal edge 16a of the tension member 16 in the circumferential direction A is smaller than an overlapping length L of an overlapped portion 18 of the tension member 16 (T<L) in the circumferential direction A, the tension member 16 is overlapped entirely in the widthwise direction B in the area shown by a letter J in FIG. 6B, and thus significant improvement of bending rigidity cannot be expected.

SUMMARY OF THE INVENTION

In view of such circumstances, an object of the invention is to provide an elastic crawler in which bending rigidity of an overlapped portion of a tension member is significantly reduced.

In order to solve the problems described above, the invention provides a technical means as follows.

That is, the present invention provides an elastic crawler including: a crawler body 2 formed of an elastic material into an endless belt shape; and a tension member 6 including a plurality of tension cords 7 having opposite ends which are embedded in the crawler body 2 so as to extend along the circumferential direction A and to be arranged in parallel to each other in the widthwise direction B, wherein the tension member 6 is formed into a loop by overlapping opposite end portions 7a of each tension cord 7, extremities 7b of the opposite ends of each tension cord 7 of the tension member 6 are aligned diagonally with respect to the widthwise direction B, and an overlapping width Y of an overlapped portion 9 of the tension member 6 in the widthwise direction B is smaller than an entire width X of the tension member 6 in the widthwise direction B at any position in a circumferential direction A.

With this characteristic construction, advantageously, bending rigidity of the overlapped portion of the tension member can be significantly reduced.

Another technical means of the invention is an elastic crawler including: a crawler body 2 formed of an elastic material into an endless belt shape; and a tension member 6 including a plurality of tension cords 7 having opposite ends which are embedded in the crawler body 2 so as to extend along the circumferential direction A and to be arranged in parallel to each other in the widthwise direction B, wherein the tension member 6 is formed into a loop by overlapping opposite end portions 7a of each tension cord 7, extremities 7b of the opposite ends of each tension cord 7 of the tension member 6 are aligned diagonally with respect to the widthwies direction B, and the relation between a distance T in the circumferential direction A from one end to the other end of a longitudinal edge 6a of the tension member 6 in the circumferential direction A and an overlapping length L of the tension cord 7 in the circumferential direction A is T≧L.

With this characteristic construction, advantageously, bending rigidity of the overlapped portion of the tension member can be reduced significantly.

The tension cords 7 may be arranged such that the opposite extremities 7b thereof are aligned to form edge lines, respectively, which are substantially parallel to each other.

The edge 6a on longitudinally opposite ends of the tension member 6 may be formed into a V-shape opening in the same direction in the circumferential direction A.

Further objects, characteristics, and advantages of the invention will be apparent from description given below.

BRIEF DESCRIPTION OF THE DRAWINGS

FIG. 2 is a cross-sectional side view showing the overlapped portion of the tension member of an elastic crawler;

FIG. 3 is a cross-sectional view showing the overlapped portion of the tension member, in which

FIG. 4 is a plan view showing an overlapped portion of a tension member according to a second embodiment;

FIG. 5 is a plan view showing an overlapped portion of a tension member according to a third embodiment.

DESCRIPTION OF THE PREFERRED EMBODIMENTS

Figure 1:
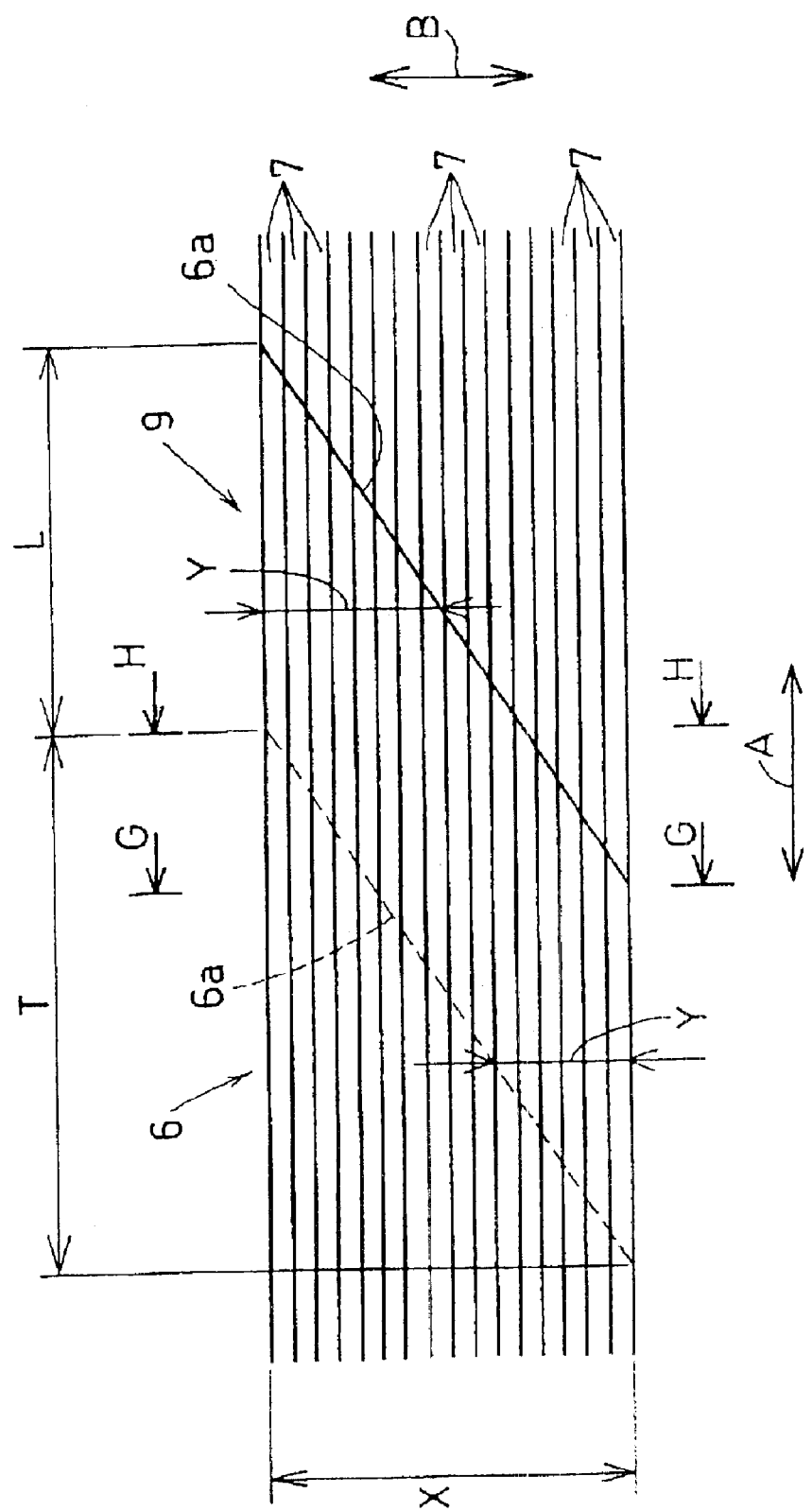
FIG. 1 is a plan view showing an overlapped portion of a tension member according to a first embodiment of the invention.

Referring now to the drawings, embodiments of the invention will be described.

Figure 3A:
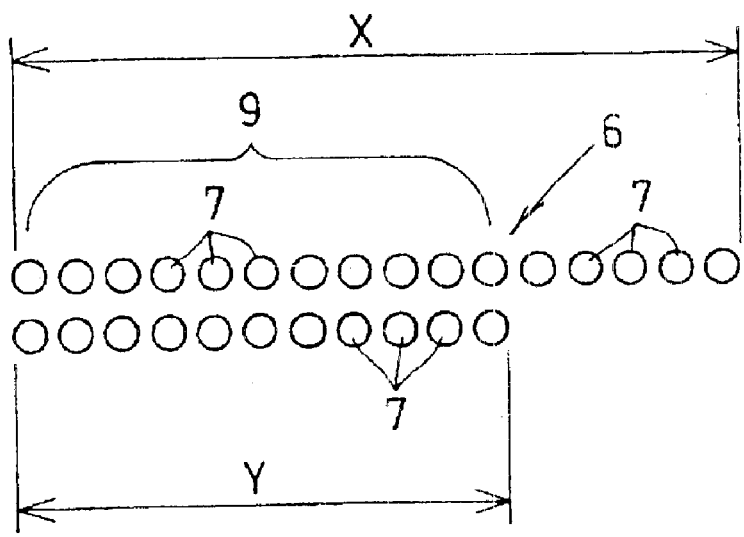
FIG. 3A is a cross-sectional view taken along the line G—G in FIG. 1.
Figure 3B:
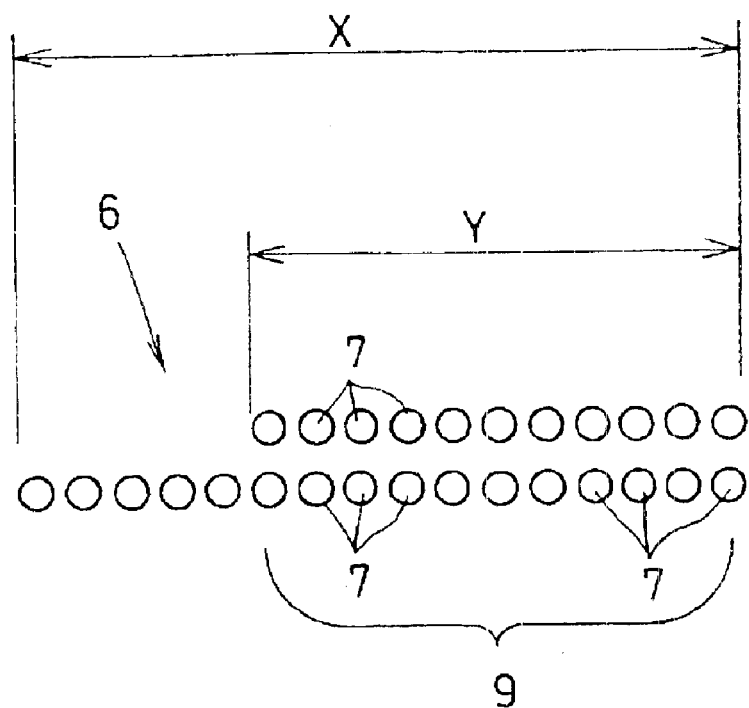
FIG. 3B is a cross-sectional view taken along the line H—H in FIG. 1.
Figure 6A:
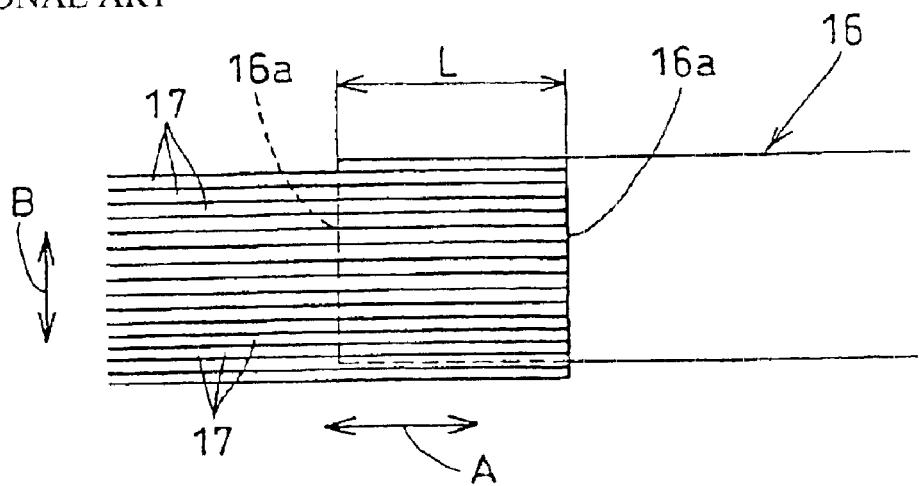
FIGS. 6A and 6B are plan views showing overlapped portions of tension members in the conventional art.
Figure 6B:
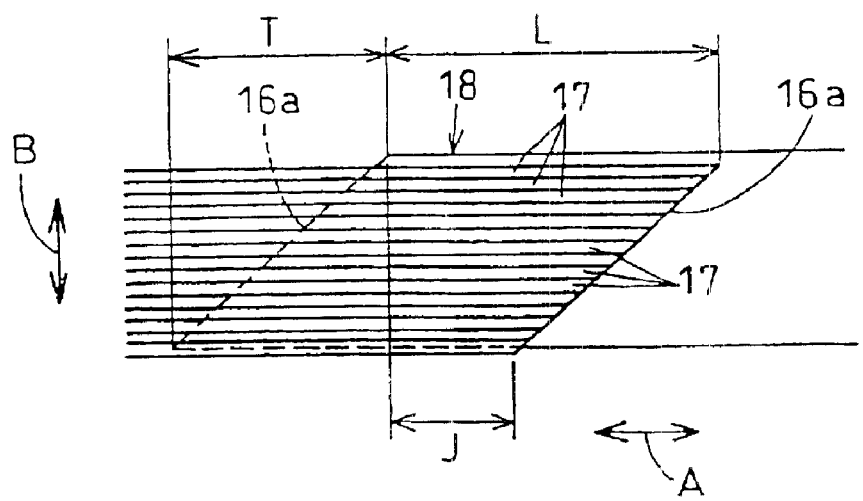

FIGS. 1 to 3 show a first embodiment. FIG. 2 shows an elastic crawler (crawler belt) 1 to be employed in crawler-mounted traveling devices, including a crawler body 2 formed of an elastic material having flexibility, such as rubber or resin, into an endless belt shape.

The crawler body 2 includes core metals 3 extending in the widthwise direction B and being embedded at intervals in the circumferential direction A along the entire periphery of the crawler. An elastic crawler without core metals may be employed.

An outer peripheral surface D, namely, a surface that comes into contact with the ground of the crawler body 2 is integrally formed with lugs 4 at intervals in the circumferential direction A along the entire periphery.

The crawler body 2 has an inner peripheral surface E integrally formed with guide projections 8 extending from the core metals 3 or the crawler body 2 at intervals in the circumferential direction A for preventing rollers or the like from running off.

The crawler body 2 defines engagement holes extending therethrough in the thicknesswise direction C of the crawler (hereinafter, referred simply as the "thicknesswise direction C) at positions in an intermediate portion thereof in the widthwise direction B and between the circumferentially A adjacent core metals 3, so that projections on the drive wheel are inserted therein for transmitting a power from a drive wheel (driving sprocket) to the elastic crawler 1. In the case of the elastic crawler 1 without core metals, the crawler body 2 is formed with driving projections for transmitting a power from the drive wheel to the elastic crawler 1 at positions in an intermediate portion thereof in the widthwise direction B.

The crawler body 2 includes a tension member 6 embedded therein for enabling the elastic crawler 1 to resist a tensile force exerted thereon in the circumferential direction A.

The tension member 6 is constructed by embedding a plurality of tension cords 7 having opposite ends in the crawler body 2, which are wound around the crawler body one full circle in the circumferential direction A, respectively, and arranged in parallel to each other in the widthwise direction B at suitable intervals, as shown in FIGS. 1 and 2.

The tension cord 7 is formed to be longer than the entire length of the crawler body 2 in the circumferential direction A, and is formed into a loop by overlapping opposite end portions 7a and 7b thereof in the thicknesswise direction C and joining them in the circumferential direction A.

Examples of the tension cord 7, which may be employed in this application, include a steel cord formed by twisting several bundles of several lengths of steel filament, other organic filament cords, such as a nylon cord or a TETRON (polyethylene terephthalate fiber, which is a polyester-based synthetic fiber of Toray Industries, Inc. and Teijin Limited) cord formed of nylon or TETRON filaments, and cords having a high tensile strength, such as an aramid fiber cord or a glass fiber cord.

An edge 6a in the circumferential direction A of the tension member 6 is cut in a diagonal direction (bias cut) with respect to the widthwise direction B, and the extremities 7b of the tension cords 7 are aligned diagonally with respect to the widthwise direction B.

Accordingly, difference of rigidity between an overlapped portion 9 and the remaining portion (between a single-ply portion and a double-ply portion) is reduced, that is, variation in rigidity of the overlapped portion 9 of the tension member 6 in the circumferential direction A is alleviated, and thus concentration of a stress onto the longitudinal edges 6a of the tension member 6 can be alleviated.

In this embodiment, the tension cords 7 are arranged such that the extremities 7b of the opposite end portions of the tension cords 7 of the tension member 6 are aligned to form diagonal lines with respect to the widthwise direction B, respectively, which are substantially parallel to each other, that is, one of the longitudinally opposite edges 6a of the tension member 6 is substantially parallel with the other end thereof. The overlapping lengths L in the circumferential direction A of all of the tension cords 7 are substantially the same.

A relation between a distance T in the circumferential direction A from one end to the other end of the longitudinal edge 6a of the tension member 6 in the circumferential direction A and the overlapping length L of the tension cords 7 in the circumferential direction A is T>L. As shown in FIGS. 1 and 3, the overlapping width Y of the overlapped portion 9 of the tension member 6 in the widthwise direction B is smaller than the entire width X of the tension member 6 in the widthwise direction B at any position in the circumferential direction A.

Accordingly, bending rigidity of the overlapped portion 9 of the tension member 6 can significantly be reduced.

In the conventional art, significant reduction of rigidity of the overlapped portion of the elastic member cannot be expected unless the length of the overlapped portion of the tension cord is reduced. However, when the overlapped portion is reduced too much, a tensile strength of the overlapped portion cannot be maintained since the minimum value of the overlapping length is determined according to the strength of the tension cord.

In contrast, according to the invention, bending rigidity of the overlapped portion 9 of the tension member 6 can be reduced even with securing a sufficient length L in the overlapped portion of the tension cord 7.

Since the variation in bending rigidity in the circumferential direction A in the area around the boundary between the single-ply portion and the double-ply portion of the tension member 6 is alleviated, and bending rigidity of the overlapped portion 9 of the tension member 6 is significantly reduced, a tension of the resilient crawler 1 while being mounted on a main unit of a machine including a clawer-mounted traveling device can be reduced. Consequently, variation in driving force for driving the resilient crawler 1 and loss of driving force can be reduced.

Recently, the number of machines driven by a small engine or motor is increasing. Therefore, reduction of loss of driving force contributes to reduce fuel consumption and power consumption.

FIG. 4 shows a second embodiment, in which the relation between the distance T in the circumferential direction A from one end to the other end of the longitudinal edge 6a of the tension member 6 in the circumferential direction A and the overlapping length L of the tension cord 7 in the circumferential direction A is equal (T=L).

In this embodiment, the relation between the overlapping width Y in the widthwise direction B and the entire width X in the widthwise direction B of the tension member 6 is equal (Y=X) at one position K in the circumferential direction A on the overlapped portion 9 (at the center in the circumferential direction A), and Y<X at any other position of the overlapped portion 9 of the tension member 6 in the circumferential direction A.

FIG. 5 shows a third embodiment, in which the edges 6a on both sides in the longitudinal direction A of the tension member 6 are formed into a V-shape opening in the same direction in the circumferential direction A, so that the extremities 7b of the tension cords 7 are aligned diagonally with respect to the widthwise direction B of the crawler.

In this embodiment as well, the relation between the distance T in the circumferential direction A from one end to the other end of the longitudinal edge 6a of the tension member 6 in the circumferential direction A and the overlapping length L of the tension cord 7 in the circumferential direction A is T>L, and the overlapping width Y of the overlapped portion 9 of the tension member 6 in the widthwise direction B is smaller than the entire width X of the tension member 6 in the widthwise direction B at any position in the circumferential direction A.

In the third embodiment, the overlapped portion 9 of the tension member 6 is bifurcated, and the overlapping width Y of the bifurcated portion is a sum of the width Y1 and the width Y2 at the same position in the circumferential direction A (Y=Y1+Y2).

The value T may be equal to the value L (T=L) in the third embodiment as well.

While only presently preferred embodiments of the invention have been described in detail, as will be apparent with those familiar with the art, certain changes and modifications can be made in embodiments without departing from the spirit and scope of the invention as defined by the following claims.

What is claimed is:

1. An elastic crawler comprising:
   a crawler body formed of an elastic material into an endless belt shape; and
   a tension member including a plurality of tension cords having opposite ends, the tension cords being embedded in the crawler body so as to extend along a circumferential direction of the crawler and to be arranged in parallel to each other in a widthwise direction of the crawler,
   wherein the tension member is formed into a loop by overlapping opposite end portions of each tension cord, extremities of the opposite ends of each tension cord of the tension member are aligned diagonally with respect to the widthwise direction of the crawler, and
   wherein an overlapping width of an overlapped portion of the tension member in the widthwise direction of the crawler is smaller than an entire width of the tension member in the widthwise direction of the crawler at any position in the circumferential direction of the crawler.

2. An elastic crawler comprising:
   a crawler body formed of an elastic material into an endless belt shape; and
   a tension member including a plurality of tension cords having opposite ends, the tension cords being embedded in the crawler body so as to extend along a circumferential direction of the crawler and to be arranged in parallel to each other in a widthwise direction of the crawler,
   wherein the tension member is formed into a loop by overlapping opposite end portions of tension cords, and extremities of the opposite ends of each tension cord of the tension member are aligned diagonally with respect to the widthwise direction of the crawler, and
   wherein a distance in the circumferential direction of the crawler from one end to the other end of the longitudinal edge of the tension member in the circumferential direction of the crawler is equal to or greater than an overlapping length of the tension cord in the circumferential direction of the crawler.

3. An elastic crawler according to claim 1, wherein the tension cords are disposed so that the opposite extremities of each tension cord are aligned to form edge lines, respectively, which are substantially parallel to each other.

4. An elastic crawler according to claim 2, wherein the tension cords are disposed so that the opposite extremities of each tension cord are aligned to form edge lines, respectively, which are substantially parallel to each other.

5. An elastic crawler according to claim 1, wherein the tension member is formed with longitudinally opposite edges having a V-shape opening toward the same direction in the circumferential direction of the crawler.

6. An elastic crawler according to claim 2, wherein the tension member is formed with longitudinally opposite edges having a V-shape opening toward the same direction in the circumferential direction of the crawler.

* * * * *